United States Patent [19]

Hines

[11] 3,914,877

[45] Oct. 28, 1975

[54] IMAGE SCRAMBLING TECHNIQUE

[76] Inventor: Marion E. Hines, 116 Meadowbrook Road, Weston, Mass. 02193

[22] Filed: Apr. 8, 1974

[21] Appl. No.: 458,783

[52] U.S. Cl. .................................................... 35/2
[51] Int. Cl.² .................................................... G09C 1/00
[58] Field of Search ........................... 35/2; 283/6, 7

[56] References Cited

UNITED STATES PATENTS

| | | | |
|---|---|---|---|
| 2,952,080 | 9/1960 | Avakian et al. | 35/2 |
| 2,969,531 | 1/1961 | Stewart | 35/2 X |
| 3,234,663 | 2/1966 | Ferris | 35/2 |
| 3,279,095 | 10/1966 | Carlson | 35/2 |

*Primary Examiner*—Joseph S. Reich
*Assistant Examiner*—John H. Wolff
*Attorney, Agent, or Firm*—Alfred H. Rosen; Frank A. Steinhilper

[57] ABSTRACT

An unreadable scrambled image is prepared from an original image of a signature or other written matter, by a special photographic procedure involving the use of a code plate which contains a complex but unique and reproducible pattern of light and dark marks representing a numerical binary code by which the image is transformed. This scrambled image is not interpretable by ordinary examination. The scrambled image may be unscrambled and read by an authorized recipient if he possesses a copy of the original code plate, simply by placing the two in intimate contact and viewing the combination.

5 Claims, 10 Drawing Figures

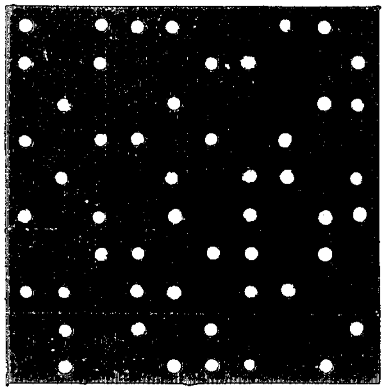
FIG. 1C CODE PLATE
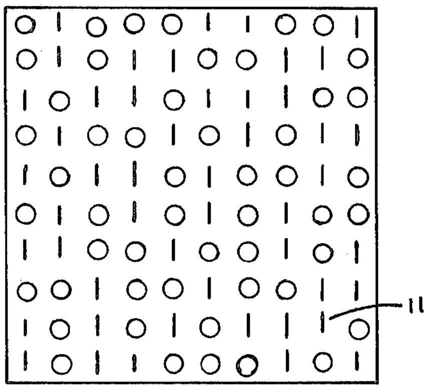
FIG. 1D CODE MATRIX
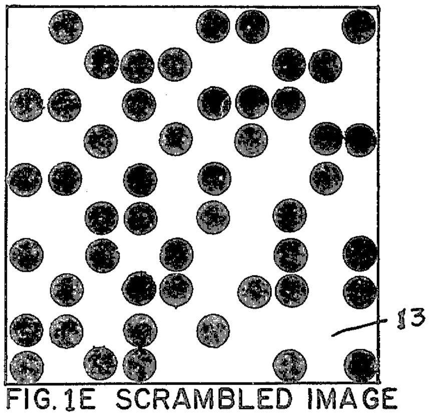
FIG. 1E SCRAMBLED IMAGE
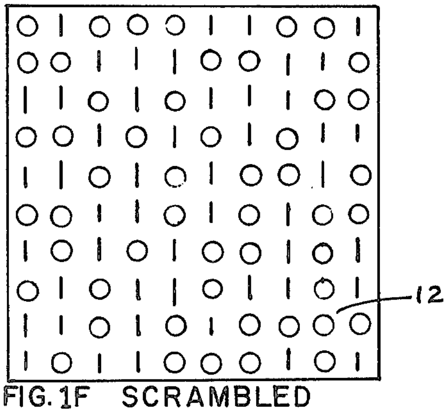
FIG. 1F SCRAMBLED IMAGE MATRIX
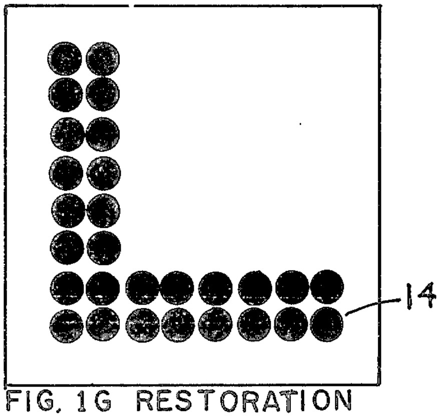
FIG. 1G RESTORATION
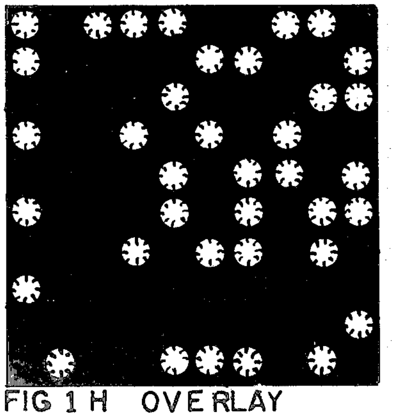
FIG 1H OVERLAY RESTORATION

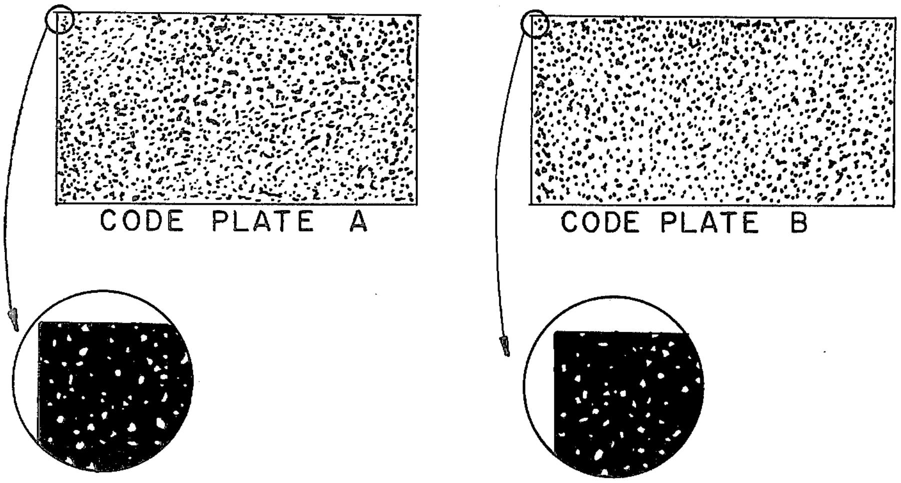
FIG. 3
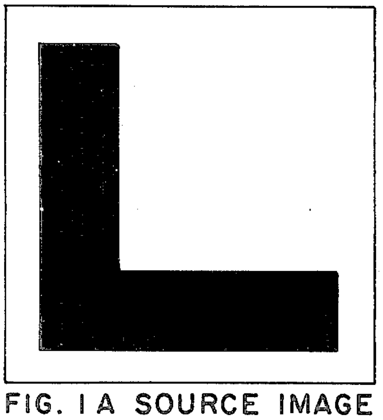
FIG. 1A SOURCE IMAGE
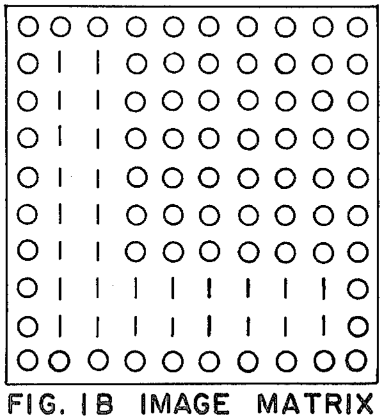
FIG. 1B IMAGE MATRIX

IMAGE SCRAMBLING TECHNIQUE

BACKGROUND OF THE DISCLOSURE

This invention relates to methods for concealing information in written or pictorial form, through preparation of a substitute "scrambled image" of the information material. The scrambled image is unreadable as viewed, but nevertheless contains the original information which can be read by an authorized recipient who possesses a proper unscrambling device.

Credit cards are now in widespread use as a means of identification of individuals authorized to make credit purchases, cash checks, etc. To prevent fraud, these often carry the authorized signature of the bearer. Nevertheless, a lost or stolen card can be used by another person who can forge the signature found on the card. A need exists for an identification card which carries a signature in a concealed form which can be read only by authorized dealers, bank tellers, or other officials. This invention provides a means for preparing a scrambled image of such a signature which can be quickly and easily read, but only with proper means.

Presently known techniques for scrambling and unscrambling an image may be classified into several distinct categories. One such category involves replacement of most of the area of the image by extraneous and meaningless background imagery, leaving numerous small bits of the meaningful image, in their original positions and coloration or density, scattered in spots over the surface or along narrow stripes. This category is exemplified by the U.S. Pat. of Avakian et al (No. 2,952,080), Jones et al (No. 3,621,589), Carlson (No. 3,279,095) and Hoeflinger (No. 3,227,474). In these techniques, viewing is accomplished through special masks or lens systems which hide the extraneous imagery, leaving only the meaningful parts exposed to view.

Another category is exemplified by Ferris and Keller in U.S. Pat. No. 3,234,663. They disclosed a method using photography of the information image, exposing a specially prepared photographic film of a special variety. This film is pre-exposed under both infra red and ordinary light in a manner which causes some parts or segments of its area to act as a "direct positive" type of film, and other parts as an "ordinary negative" film. The two types of area segments form contiguous zones scatter over the surface in a meaningless code pattern. When this prepared film is exposed and then developed to produce an image, the repeated changes in character from positive to negative over the surface cause a confusion of the image in the subsequently developed film. They show how this confused image may be restored by use of a photographic reproduction process using a second film modified by the same code pattern.

A third category of image scrambling techniques involves the use of the modern principles of optical holography.

A fourth category involves the use of fiber-optics in which tightly packed bundles of minute glass fibers act as multiple light-pipes or waveguides to transfer the image from one cross-section plane to another. When the fibers within the bundle are multiply interchanged in position, the image becomes redistributed over the surface in an unreadable scrambled way. By retransmitting the scrambled image back through the same bundle, the original image reappears.

A fifth category involves the use of lenses in the production of an aberrated image in a controlled manner which becomes thereby, unreadable, but may be deaberrated by special techniques.

A sixth category involves the use of multiple lenses to produce multiple partial images of the original, scattered over a surface in an intermixed and inverted form.

A new category is exemplified by my invention described in this disclosure, in which the brightness of the image is sampled at a large number of discrete points in a closely spaced array or matrix covering the surface, this information then being converted into a two-dimensional array or matrix of binary marking designators which may be displayed upon a surface, or transmitted or recorded sequentially by scanning methods, the binary designators being selected by logical rules depending upon a binary code descriptor assigned to each matrix position, and also upon the brightness of the image at the position of each such matrix point. This scrambles the image by a process akin to encoding. The invention includes specific techniques for scrambling in this way and for restoring the image into a readable form.

SUMMARY OF THE INVENTION this invention is a technique for the preparation of an image in an unreadable scrambled form and for restoring the sense of the image through the use of a binary code. The original image is sampled at a large number of discrete points distributed over the surface in a two-dimensional array or matrix of defined positions, the brightness being quantized as either dark or light, without intermediate gradations. A prearranged code pattern of binary code descriptors is assigned, one to each of the matrix positions. This code pattern is provided as a transparency code plate with either a transparent spot or an opaque region at each matrix position serving as the binary descriptor. The scrambled image is prepared as a marked surface, a binary designator mark being placed at each matrix position, these designator marks being selected by logical rules of binary transformation depending upon the light or dark quantized character of the image at that point and upon the code descriptor assigned to that point. Random or pseudorandom code patterns are used such that no meaningful image can be discerned in the pattern of markings of the scrambled image. To unscramble the image, the code pattern must be used again, and the logical rules may be used again to restore the original light and dark character at each matrix position to give a meaningful restoration of the original image.

In a preferred embodiment of this invention, special photographic techniques are used to produce the scrambled image as a matrix of dark and opaque or clear and transparent binary designator marks distributed over a surface. It is possible to restore the sense of the image by directly overlaying the scrambled image with a replica of the code plate and viewing the combination.

DESCRIPTION OF THE INVENTION AND A PREFERRED EMBODIMENT

First, I will explain the basic principles of this invention, followed by a more explicit description of a preferred embodiment.

One basic principle is that of discrete numerical sampling and reconstruction of an image. The brightness of an image can be determined at each of a large number of closely-spaced discrete points distributed in a matrix pattern over the surface, and this brightness can be expressed as a discrete number for each such point. The set of all such numbers can be used as the body of information by which the image may be transmitted, stored, encoded, decoded, modified, and/or reconstructed. The original image can be reproduced on a new surface by marking a small zone around each matrix point with any visible method such that the local brightness is equivalent to that specified by the number previously determined, the marked zones being substantially contiguous and non-overlapping. For faithful and detailed reproduction, the matrix points must be closely spaced, corresponding to the degree of resolution required for the image. This principle of sampling an image and restoring it is well-known in the art, and is used in some forms of facsimile and television transmission.

In this invention, we are primarily concerned with black and white images such as written signatures, printed matter, and the like. For such images, the brightness of each sample may be described by choosing one of two simple binary number digits, representing white and black samples respectively. In mathematical terminology, the binary number digits are commonly written as 0 and 1, but any pair of distinguishable symbols may be used instead. For example, in electrical transmission of a set of binary numbers, two different forms of voltage pulses are used, transmitted sequentially. In magnetic recording, tiny sections of tape may be magnetized in two distinct ways, these sections being sequentially placed in rows along the tape. In the preferred embodiment of this invention, binary digital symbols are placed in a matrix array on photographic plates to record, store and transport this numerical picture information. Here, a spot placed on a photographic film at a specified position may symbolize or represent the binary digit one, (or if preferred, the zero). If the spot is missing at that position, the alternative binary digit is symbolized and represented. A photographic plate with spots of this type placed in a two-dimensional matrix of row and column positions is used to record, in a binary digit format, the fact that the image is light or dark at each position. If an image is directly sampled and recorded in this way on a photographic plate, the image content can be seen in the array of spots because the plate will be lighter or darker, depending upon the density or number of spots present in a given area. Nevertheless, in this invention the scrambled image is prepared as a simple recording of binary digits in just such an array of spots. However, in the recording process, a binary transformation is used to interchange the two binary digits at approximately 50 percent of the matrix positions, using a binary code. When this encoding is properly done, using a suitable code, the image is no longer discernable by examination of the plate.

A binary code is a sequence or array of binary digits prepared in advance and known or reproducible in detail by the intended recipient of the scrambled message. Here, a photographic code plate is used which has a row-and-column or other regular matrix format or, alternatively, with irregular placement of positions. Ideally such a code matrix has its binary digits chosen quite randomly as, for example, by the flip of a coin. More practically, pseudo-random sequences may be used, these being generated by a reproducible sequence of arithmetical operations in a digital computer. In a well-chosen code, the two digits are equally probable of occurrence, with the statistical properties of the array being substantially random, so that no meaningful or repetitive pattern is apparent.

Encoding of a meaningful sequence or a matrix array of binary digits is accomplished by identifying and pairing each digit of that sequence with a corresponding digit of the code, and generating a new sequence by logical rules, one new digit for each such corresponding pair. Various statements of such rules are possible and usable. For example, one set of such rules can be stated:

1. If a message digit is a zero and the paired code digit is zero, the new digit shall be zero.

2. If the message digit is zero and the code digit is one, the new digit shall be one.

3. If the message digit is one and the code digit is zero, the new digit shall be one.

4. If the message digit is one and the code digit is one, the new digit shall be zero.

Such an encoding process is reversible, using an equivalent set of rules to restore the original array. The encoded array is again paired with the code array, point by point, and the same rules are again applied to regenerate the original information. Such encoding and decoding techniques are well known in the field of cryptography.

In the preferred embodiment of this invention, each of these processes is accomplished photographically, using techniques and methods which are described in this disclosure. To aid in this description, drawings are provided which are briefly described as follows:

FIG. 1 (A–H) shows the fundamental principles used in preparation of a scrambled image from an original or source image and a code plate, and for restoring the sense of the original image.

FIG. 3 shows a pair of code plates using random placement of symbols.

Figure 2:
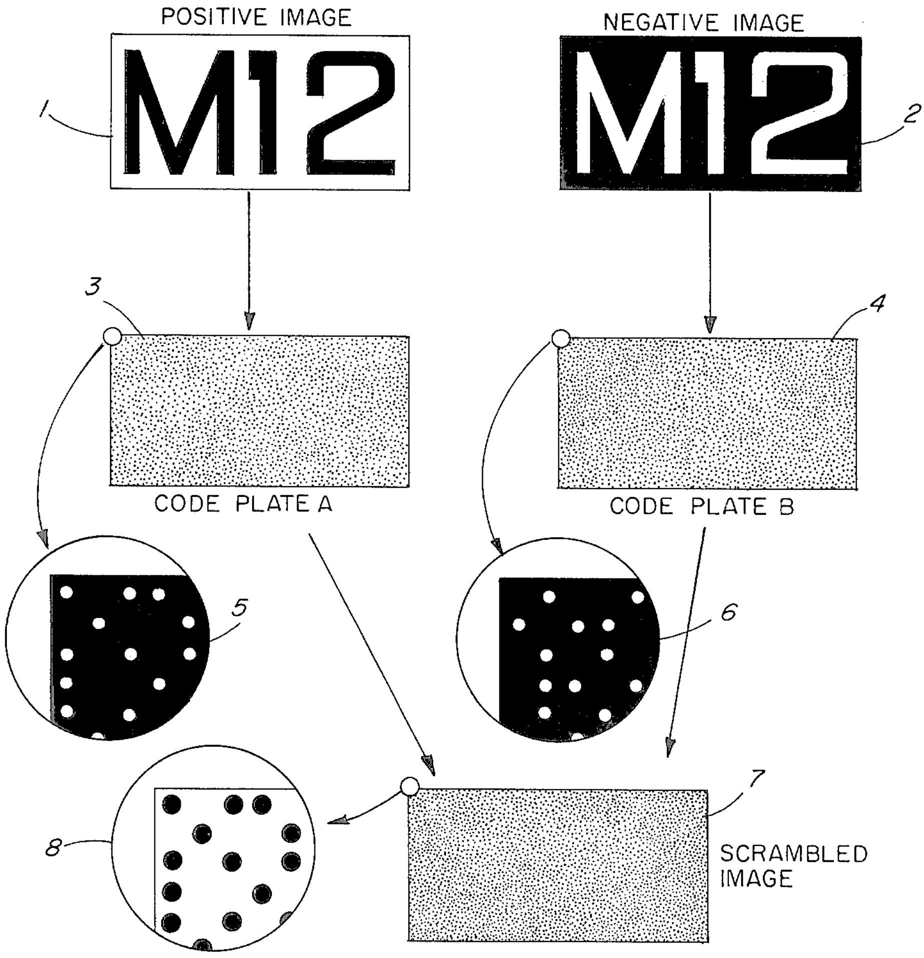
FIG. 2 shows a photographic exposure sequence used in one embodiment of the invention for producing a scrambled image, using a positive image, a negative image, and two complementary code plates.

Referring now to FIG. 1, these principles and their application are illustrated by a simplified example. The original image of FIG. 1A is the block letter L. In actual practice, much more complex images are treated, such as a signature, a typewritten page, or a drawing. FIG. 1B shows the results of numerically sampling this image at 100 points, arranged in a 10 × 10 regular matrix over the surface. Here the digit 0 is recorded for a white sample and 1 for a black sample, placed at the positions where the samples were taken. In actual practice, for more complex images, thousands or millions of sampling points are used. FIG. 1D shows a binary code matrix for the 100 point 10 × 10 array, which is a complex random pattern chosen in advance without reference to the specific information for which it is to be used. FIG. 1C is a code plate for this identical code, where different symbols are employed, in this case a white dot representing a 0 and the absence of a dot representing a 1. Throughout this example, 0 represents a light marking, 1 a dark marking. Such designations are, in general, optional. FIG. 1F is a numerical scrambled image matrix for the image of FIG. 1A. Here, each digit was chosen by pairing the correspondingly placed digit on the image matrix with the correspondingly placed digit on the code matrix, using the four logical rules given previously. For example, at 10 on on FIG. 1B, we have a 1 representing a black sample taken near the lower right-hand corner of the image. At this position on the code matrix there is also a 1 shown at 11. Using rule 4., we place a 0 at the corresponding position 12 of the scrambled image matrix, FIG. 1F.

FIG. 1E shows a form of scrambled image which I have used. Here, black dots are used to represent 1's and blank positions represent 0's. FIG. 1E is, in the information sense, identical to the matrix of FIG. 1F. In FIG. 1E, or FIG. 1F, no vestige of the letter L can be discerned, the pattern appearing to be quite random and meaningless. Nevertheless, for one possessing a replica of the code plate, it contains the information necessary for restoring the original image. To restore the image, the matrix of the scrambled image is combined with the same code matrix, point by point, using the same set of four logical rules to generate a matrix identical to that of FIG. 1B. To visualize the result, black marks are placed on a white surface at each point where the digit is 1, and no mark is placed where the digit is zero, giving the result shown in FIG. 1G. Following through on the example, the 0 shown at 12 on FIG. 1F is represented on the scrambled image by the white blank space 13 on FIG. 1E. Combining the 0 at 12 with the 1 at 11 gives a 1 according to logical rule 2., so that we place a black dot at 14 on the restored image of FIG. 1G.

If one possesses a code plate as in FIG. 1E in the form of a transparency film so that the white dots are transparent and the background is opaque, and a scrambled image in the form of FIG. 1E where the background is transparent and the dots opaque, then there is a very simple technique for visualizing the original image. The code plate is simply overlaid on the scrambled image, taking care that the matrix positions coincide, and the combination is viewed with a bright transmitted light. The result is illustrated in FIG. 1H for this example. The letter L can be visualized here although somewhat indistinctly. In those regions where the original image was black, the black dots of the scrambled image overlay the transparent dots on the code plate, blocking all light transmission, so that the appearance is black. In the regions where the original image was white, the dark dots of the scrambled image lie only over the dark regions of the code plate, causing no further blockage. However, only 50% of the matrix positions allow light to pass the code plate, causing some loss in resolution and confusion of the image boundaries. In actual practice, however, the dots are so small and so closely spaced that they are not individually resolved by the eye, and many more are involved with each letter of the image, so that the image becomes adequately clear and distinct and there is no difficulty in interpretation. The image is seen as black where it was originally black, against a background which appears to be gray, although a somewhat mottled gray, because of the random distribution of dots on the code plate. FIG. 1H shows enlarged bright spots, intended to represent the effect of visual blurring when viewed with a high intensity light from behind.

Referring now to FIG. 2, I next describe a simple photographic technique for the preparation of a scrambled image using the basic principles described earlier. Sketches 1 and 2 both show the "message" M12, 1 being provided as a "positive" photographic transparency, and 2 as a "negative" transparency, of the identical image. Such a negative image as 2 is normally obtained as the first result of ordinary photography of a black-on-white picture of printed matter. The positive transparency 1 may be obtained by ordinary contact printing from 2, again using ordinary photographic film. In each of these sketches, the white areas are meant to represent clear and transparent regions, the dark area black and opaque.

Items 3 and 4 represent two transparencies which are "complementary" code plates. Here, we show at 5 and 6, enlarged views of one corner of each of these plates as seen under a magnifying glass. These plates are predominantly black and opaque, but each has an array of tiny transparent dots distributed over the surface, shown white in these sketches. These dots are arranged in regular rows and columns, but here, as in FIG. 1C, the dots are present in only 50% of the row and column positions, the presence or absence of a dot being chosen in a random or pseudo-random manner as, for example, by the flip of a coin. It will be noted by detailed examination of the sketches 5 and 6 that the two code plates are exactly "complementary," that is, where a dot appears on one, it is missing at that position on the other. The arrays of positions, in regular rows and columns, are geometrically congruent, the two patterns on the two plates having the same arrangement, and being of the same size. If these two plates are placed in intimate contact in exact register, there will be a dot at each position on one or the other plate, but each will be covered or underlaid by a dark zone on the other plate.

The scrambled image 7 is prepared as follows. An unexposed photographic film is closely overlaid with the A code plate 3, which is further overlaid with the positive original image 1. Light is allowed to pass through 1 and 3 to expose the film which later becomes 7. The technique is similar to that of ordinary "contact printing," common in photography. This exposes a pattern of dots in the arrangement of 3, but only in those parts of the area of 1 which are transparent. Then a second exposure is made on the same film in the same way, using the B code plate 4 and the negative image 2. This exposes the pattern of the dots from 4, but only in the transparent regions of 2 which are the same as the dark regions of 1.

In these two exposures, care must be taken to see that the positive and negative images are accurately aligned or registered in the same position over the film and code plates, and the two code plates must also be precisely registered. In this procedure, the entire area of the film is covered with a pattern of exposed dots, some from code plate 3 and some from code plate 4. After development, the newly exposed film becomes the scrambled image 7. This image is composed of an array of dark spots as shown in the enlarged view 8, with a transparent background. With few exceptions, these spots are of the same size, are equally dark, and are present at approximately 50% of the matrix positions with an apparently random placement. The scrambled image 7 will show no pattern which resembles the original image if the code is properly random, and if care is taken to provide equal exposures.

The code plates 3 and 4, when combined with the positive and negative images 1 and 2, provide the combined functions of sampling of the image and encoding it. Because the transparent coding dots are very small, there is little likelihood that one will lie on a boundary between white and black, and therefore the transmission of light normally has a quantized binary character without gradations. When light passes through a spot on the code plate and the adjacent image is transparent, a spot of light will fall on the film below, which will develop as a black spot. It is apparent that a black spot will be developed on the scrambled-image film at a given matrix position if the image 1 is light at that position and a transparent spot appears there on code plate 3, of if the image there is dark (but light on image 2) and the spot is absent there on code plate 3 (but present there on code plate 4). No spot will be developed at that position if the image is light at that position and no dot appears there on code plate 3, or if the image is dark there but a dot is present on code plate 3. In this way, the logical rules that have been given are applied and the encoded binary symbols are developed on the scrambled image.

The scrambled image 7 is interpretable as a matrix or array of binary symbols, designated by the presence or absence of a spot at each matrix position. Together with a replica of either code plate, which is also a matrix of binary symbols, we have all the information necessary for decoding and restoring the image. As previously described, by pairing these binary symbols, and by applying an analogous set of logical rules, we can determine whether the original image was light or dark at each matrix position.

A photographic method can be used for completely restoring the scrambled image as explained in reference to FIG. 1G, and this is closely analogous to the method of preparing the scrambled image. Such a complete restoration is not normally required, because one can obtain the sense of the image by a simpler procedure, as explained in reference to FIG. 1H. Nevertheless, the technique for complete restoration will now be described to complete the disclosure. First, the scrambled image may be reproduced photographically by contact printing to provide a "negative" image of it. Also needed are replicas of the two complementary code plates which were used to prepare the scrambled image, or the originals. Again, a double exposure is made on fresh, previously unexposed photographic film or paper. As before, the positive version of the scrambled image is exposed through one code plate and the negative version is exposed through the complementary code plate, in the same manner as illustrated in FIG. 2. When developed, the film will have dark spots at each matrix position where the original image was dark, and no spots will appear where the image was light. If the two code plates are interchanged for these exposures, the restored image will have a negative character, dark spots being present where the image was light and no spots where it was dark.

However, the sense of the image can be more easily obtained by the simple procedure of placing the scrambled image in direct contact with a replica of code plate B, item 4 of FIG. 2, and viewing the combination in transmitted light. If properly placed in exact register, a replica of the original image will appear. However, this fully restores only the black parts of the image. In these parts, the dark spots of the scrambled image cover all of the transparent dots of the code plate, blocking all light transmission. No such blocking occurs in the light parts of the image, but, the code plate has light dots at only 50% of its matrix positions. Thus, the image which is seen appears as black where it should be black, but, where it should be white, it appears to be gray, with a somewhat mottled appearance caused by the randomness of the distribution of spots on the code plate. Experience has shown that this causes no difficulty in reading printed or written matter, when the lines in the image are somewhat wider than the spacing between matrix positions, according to well known sampling principles.

If the scrambled image is placed in contact with code plate A instead of code plate B, the sense of the image will also be observable, in this case in a negative form. When this is done, the parts of the original image which were originally light will now appear to be totally dark, and the parts which were dark will appear to be gray and mottled.

It is possible to prepare a single code plate with a special pattern which will serve as its own complementary code plate upon lateral translation to a new position, or by rotation of the pattern to a new orientation. I have done this through the use of a special code pattern which contains portions which are complementary to other portions, in composite array. In this way, a single plate can serve as both code plate A and code plate B by a suitable repositioning between the two exposures described.

Code plates such as those shown at 3 and 4 can be made in a variety of ways. I have done this by first preparing a large scale pattern consisting of an array of black dots on a sheet of white paper. This was photographed by an ordinary camera, using a high-contrast film, and using a high degree of size reduction to obtain a closely-spaced array of tiny transparent dots on the "negative". This negative served as a code plate. Replicas of the code plate can be made by "contact printing" procedures commonly used in photography.

The large-scale paper version of the code plate was made with the aid of a digital computer, which was programmed to generate a pseudo-random binary sequence, and to print these as an array of black "periods" and blank "spaces" on white paper, symbolizing binary 1's and 0's. This program also generated the complementary array on a second sequence of operation, thus providing separate patterns for the code plate A and the code plate B.

There are several critical features of the method of this invention which should be followed carefully. When the photographic method of FIG. 2 is used, those parts of the scrambled image which represent light areas of the original image contain the pattern of code plate A, directly transferred by contact printing, and those parts representing dark areas contain the pattern of code plate B. These patterns should be indistinguishable to the unaided eye, which means that they should have the same density or number of spots per unit area, on the average, and there should be no apparent regularity in the patterns of dot selection which would give evidence of transitions from the pattern of one code plate to the pattern of the other at the boundaries between light and dark zones. This condition can be satisfied if the code is selected randomly with a 50% probability that any position is occupied by a spot, on either code plate. Another way of stating this criterion is that the distribution of spots on the two code plates should be statistically the same and statistically uniform, but, different in detail.

It is also important that the transparencies 1 and 2 be substantially "quantized", with all zones being either transparent or opaque with substantially no "gray" areas. These transparencies should also be carefully registered so that every transparent zone of 1 is accurately congruent with the corresponding opaque zone of 2, and vice versa. If these two transparencies are overlaid together in register and viewed by transmitted light, one should see no light through the pair; neither should there be an overlap of opaque zones anywhere in the combination. It is also important that the two optical exposures be equal so that the dots on the scrambled image show no variations in density between the dark and light zones of the image. When properly done, every part of the scrambled image will show an equal density of spots and the original image cannot be distinguished in it by the unaided eye.

In the descriptions presented in connection with FIGS. 1 and 2, the sampling positions and the arrays of binary symbols have been arranged regularly in ordered rows and columns. The same principles apply for other arrangements. For example, a triangular arrangement might be made by dividing the surface with imaginary lines into a large number of uniformly-sized equilateral triangles, and placing a sampling position at the center of each triangle. It is also possible to use an irregularly placed set of sampling positions, even to the extreme case of random placement.

I have made satisfactory code plates by spraying black paint lightly over a surface of transparent plastic material so that the individual droplets covered only a fraction of the surface area, leaving the sheet "cloudy" but predominantly transparent. This sheet was then laid on a sheet of photographic film and the combination was exposed to light from above. When developed, the film became opaque over most of its area but with many tiny transparent apertures scattered over the surface, each caused by the shadow of a paint droplet. This developed film is directly usable as "code plate A" in the method of FIG. 2. To prepare a corresponding "code plate B," one can repeat the process with another sprayed plastic sheet and another piece of photographic film. Alternatively, one can use the original sprayed plastic sheet laid on another piece of photographic film in a different orientation to make "code plate B". Still another alternative is to use the "code plate A" again, to serve the function of "code plate B" but placed in a different orientation for the second exposure, for example, by inverting it through 180° rotation in its plane.

In FIG. 3 is shown a code plate A and a code plate B mode by such a random process. These are alternatives to the corresponding plates shown in FIG. 2 and serve the same purpose in the same way following the same procedure. In the circular inserts of FIG. 3, views of these plates are shown as seen under a microscope. The appearance is quite similar to the plates shown in FIG. 2 except that the transparent dots are randomly placed and have various sizes and shapes.

The basic principles are the same whether one uses regularly positioned dots of uniform size or irregular randomly placed dots of various sizes. In either case, 50% of the sampling positions are established by one code plate and 50% by the other. In both cases the two code plates should have the same statistical distribution of sampling positions but differ totally in detail.

When using regular dot placements and uniform dot sizes, those dots which lie on a picture boundary between black and white zones may be incompletely reproduced on the scrambled image, giving some visible evidence of the existence of such a boundary and thereby causing some compromise in secrecy. When randomly sizes and placed dots are used, this effect is not easily seen, even under a microscope.

There is a disadvantage in random placement in that some dots inevitably overlap others on one code plate; and at the same position, some dots from the separate code plates overlap in position. This causes a degree of loss in resolution when restoring the image by the overlap method, reducing the number of visible bright spots seen in the light parts of the image. However, the dark parts are faithfully reproduced. Experiments have shown that this technique gives highly satisfactory results, nevertheless.

The basic principles I have described can be implemented in a wide variety of ways to scramble (or encode) an image and to restore it, using a binary code pattern. The photographic technique of the preferred embodiment is only one of these. Other techniques and embodiments will be apparent to those skilled in the arts of photography and other forms of graphic reproduction. Other matrix patterns may be used, different colored markings are possible, different reproduction techniques, etc. Such variations are considered to lie within the scope of this invention.

I claim:

1. For confidential communication of the information contained in a source image consisting of a pattern of light and dark regions, a method of making an uninterpretable encoded image thereof and of restoring the said information pattern into an interpretable form from said encoded image, said method constituting the following steps:

a. designating a finite and denumerable array of discrete points in a two dimensional geometric surface in which said points are regularly spaced in a repetitive and periodic manner with their relative positions established to permit their location on various material surfaces;
b. assigning to each of said points one or the other of two binary code descriptors selected in a random or pseudo-random manner to form, in the entire set of assignments, a distinctive code;
c. making a record of said code assignments for future use;
d. locating said array of points on the surface of said source image and sampling said image at each of said points to determine if it lies in a dark or a light region;
e. determining a binary message designator for each of said points following a set of logical rules of substitution wherein the choice is dependent upon the said determination of light or dark and upon the binary code descriptor assigned to that point.
f. making a record of said binary message designators on a message surface, consisting of an array of binary symbols arranged in the pattern of said array of points to provide said encoded image;
g. providing, at the place of destination of said communication, said encoded image and said record of code assignments;
h. providing a restoration surface upon which said restoration is to be observed;
i. producing, on said restoration surface at the locations of said points of said array, local non-overlapping zones of light or dark appearance for which the choice of light or dark is determined by a set of logical rules of substitution depending upon the binary symbol recorded at each such point of said array on the said encoded image and upon the said binary code assignment for the corresponding point such that said zone of appearance is light if said original image was light and dark if said original image was dark at such point, or vice versa in all cases, the pattern of said light and dark zones of appearance constituting said restoration of said information.

2. The method according to claim 1, in which said encoded image is prepared by a method comprising the following steps:

a. providing said source image;

b. providing a negative image of said source image in which regions of light appearance are made dark and dark regions are made light;

c. preparing a first and second code plate by a method constituting the steps of:

1. establishing on each of two material surfaces said array of points, identically placed on said two surfaces;

2. on the first of said surfaces, placing a visible spot at each of the said points to which has been assigned the said first type of binary code descriptor;

3. on the second of said surfaces placing a visible spot at each of said points to which has been assigned the said second type of binary code descriptor, d. providing a photo-sensitive plate for receiving said encoded image;

e. combining said source image with said first code plate to provide a first optical exposure of said photosensitive plate;

f. combining said negative image of said source image with said second code plate to provide a second optical exposure of said photo-sensitive plate; and g. developing said photosensitive plate to provide said encoded image.

3. The method according to claim 2 wherein the recorded symbols on said encoded image record are local zones of light or dark appearance and wherein the restoration of the information pattern of the source image is accomplished by optically combining one of said code-plate images with said encoded image with said arrays of spots and zones of appearance in register, said combined images constituting said restoration.

4. The method according to claim 3, wherein one of the following conditions exists:

a. said code plate is transparent at said spots;

b. said light zones of appearance on said encoded image are transparent; and c. both (a) and (b) exist simultaneously; and wherein said images are combined by overlying one with the other in register.

5. For confidential communication of the information contained in a source image consisting of a pattern of light and dark regions, a method of making an uninterpretable encoded image thereof and restoring, at the place of destination of communication, the said information pattern into an interpretable form from said encoded image, said method constituting the following steps:

a. preparing a first code plate consisting of a distribution of minute transparent optical apertures in an otherwise opaque surface;

b. preparing a second code plate as in (a) but with a different arrangement of apertures;

c. providing a positive transparency image of said source image in which said light regions are transparent and said dark regions are opaque;

d. providing a negative transparency image of said source image in which said light regions are made opaque and said dark regions are made transparent;

e. providing a photosensitive plate to receive said encoded image;

f. overlaying said photosensitive plate with said positive transparency image and said first code plate and optically exposing said photo sensitive plate through said overlays;

g. overlaying said photosensitive plate with said negative transparency image and said second code plate and providing a second optical exposure of said photosensitive plate through said overlays;

h. developing said photosensitive plate to provide said encoded image;

i. at the place of destination of communication, providing said encoded image;

j. providing one of said code plates or a reproduction thereof;

k. overlaying said encoded image with said code plate in register and viewing the combination to provide said restoration of said information.

* * * * *